Aug. 27, 1968 R. D. SMITH 3,398,994
ANTI-SKID WHEEL CONTROL SYSTEM FOR RAILWAY CARS
Filed Sept. 14, 1966 2 Sheets-Sheet 2

INVENTOR
ROBERT D. SMITH
BY Hurvitz, Rose & Greene
ATTORNEYS

United States Patent Office 3,398,994
Patented Aug. 27, 1968

3,398,994
ANTI-SKID WHEEL CONTROL SYSTEM
FOR RAILWAY CARS
Robert D. Smith, Irwin, Pa., assignor to Westinghouse
Air Brake Company, Wilmerding, Pa., a corporation
of Pennsylvania
Filed Sept. 14, 1966, Ser. No. 579,417
13 Claims. (Cl. 303—21)

The present invention relates generally to vehicle braking and propulsion control systems and more particularly to systems which provide smooth stops, controlled stopping distances, and controlled acceleration and deceleration, without requirement for mechanical or other load weighing instrumentation, and having automatic brake or propulsion power correction upon wheel slip or spin.

In accordance with a primary feature of the invention, braking of a car or vehicle is automatically maintained adjusted to a preset value, or in accordance with a preset program of values called a profile, taking full account of car weight and inherently blending the brake dynamics of the system. The car or vehicle is provided with a dynamic braking system and with a friction braking system. If the car were not following a desired profile, an error signal would develop from comparison of an accelerometer output with the profile. The error signal is utilized to control the friction brake in such sense as to reduce the error toward zero. If the dynamic brake were supplying braking effort, and the profile were not being followed for that reason, the error signal would release the friction brake for a sufficient time to establish the correct rate. If deceleration were too great the error signal would release brake until the error signal had attained zero value.

The braking effort required must be correlated with total car weight, i.e. for the number of people aboard. Thus, the more people aboard a car the greater the braking effort required to stop the car in a prescribed distance, the latter value being established by the deceleration profile. The present system, in response to an error system, referred to in the last previous paragraph, automatically corrects the friction brake to maintain the deceleration rate called for by the profile. Thereby is provided an automatic compensation for weight of the car and a blending of friction and dynamic braking.

Deceleration may be called for manually, or by means of wayside signals, which indicate a station stop at a prescribed distance and initiate functioning of a rate control profile for the car, which will, if followed, bring the car to a full stop in the prescribed distance and therefore at the prescribed location.

When the car stops, the accelerometer output becomes zero, which leaves the control system calling for full brake. Thereby an automatic full service brake is provided at the end of the braking procedure. When a proceed signal is received, the deceleration profile source is disconnected, and a control polarity opposite to that provided by the profile source is connected. The brakes will then release, and power will thereafter be called for.

The present system is rapidly operating and can be utilized for control of pneumatic and/or electric brake systems, and may be incorporated in a complete system of closed and open loop control for transient cars, such as is disclosed in an application for United States Letters Patent, Ser. No. 527,594, filed Feb. 15, 1966, in the name of Blanchard D. Smith and assigned to the assignee of the present application.

As a further feature, a car wheel angular accelerometer is provided, which provides one signal to a summing amplifier, the other signal being provided by a linear accelerometer. The output of the amplifier is arranged to be zero, unless the wheels are spinning, that is, accelerating faster than the car, or slipping, that is, decelerating faster than the car. In either of the latter two cases, the polarity of the signal provided by the summing amplifier indicates whether to apply brake and stop wheel spinning or release brake to correct wheel slipping. Normally, the required correction is momentary, and can supersede profile controlled deceleration.

As a further feature, the output of the linear accelerometer is compared with a limiting value, to assure that linear retardation of vehicle speed is limited to a rate which will not produce discomfort in passengers.

Provision is made for controlling not only deceleration, operative automatically in either direction of vehicle travel, but concurrently of acceleration in either direction, all controls being effected in terms of an error signal derived from inputs including only one accelerometer.

It is, accordingly, a primary object of the present invention to provide a novel electronic brake control system in which slipping and spinning of wheels is automatically corrected.

It is another object of the present invention to provide a system of maintaining a desired braking profile which eliminates mechanical or other load weighing instrumentation.

A further object of the present invention is to provide a novel electronic brake control which assures bringing a vehicle to a stop in a predetermined distance, by causing the vehicle to follow a predetermined braking profile regardless of vehicle weight.

A further object of the invention resides in the provision of an electrical braking control system for vehicles which avoids mechanical and dynamic brake blending expedients.

It is another object of the invention to provide a braking system for vehicles in which linear vehicle acceleration is compared with rate of change of rotational speed of a vehicle wheel to generate a control signal, and to modify brake and power controls so as to avoid wheel slide during brake control and correct wheel spin during application of power.

It is still another object of the invention to provide an error or servo controlled train braking system which is operative in either forward or reverse travel of the train.

The above and still further objects, features and advantages of the present invention will become apparent upon consideration of the following detailed description of one specific embodiment thereof, especially when taken in conjunction with the accompanying drawings, wherein.

Referring now to the accompanying drawings, 1 is a linear accelerometer, secured to a car or vehicle, and capable of measuring acceleration, for example, over the range 0–0.5 g. and providing a corresponding output voltage, which is applied to the input of amplifier 2. This output is negative when deceleration occurs while the vehicle is travelling forwardly, and reverse for acceleration or for deceleration rearwardly. 3 is a velocity pickup, specifically a wheel forwardly mounted generator or tachometer. The output of velocity pickup 3 is differentiated in differentiator 4, to provide a rate signal, and the output of the latter applied to the input of amplifier 2. The two inputs to amplifier 2 then represent the linear acceleration of the car and the angular acceleration of the wheels, respectively. Amplifier 2 is arranged to provide zero output if these accelerations are equal, but to provide an error signal if they are not. The error signal is thus an indication that the wheels are slipping or spinning, that is decelerating or accelerating faster than the car, and the polarity of the error signal indicates whether to apply brake to stop wheel spinning or to release brake to correct wheels slipping. Correction will continue so long as error signal is present, but usually occurs only momentarily.

The output of accelerometer 1 is negative for deceleration while the car or vehicle to which it is secured is proceeding in a forward direction. For this same condition velocity pickup 3 provides a positive signal. For reverse travel, the algebraic signs of the outputs of the accelerometer and velocity pickup reverse.

If during braking in either direction of travel, the wheel decelerates in rotational speed faster than the accelerometer indicates the vehicle is decelerating linearly, a net positive voltage is supplied by amplifier 2, which effects a reduction in brake forces. When, after the brakes are released, the wheel tends to return to its proper rotational speed, the voltage output of amplifier 2 will move to increase brake forces until the output voltages of the accelerometer and the velocity pickup correspond except for polarity, so that amplifier 2 provides a zero output.

Figure 1:
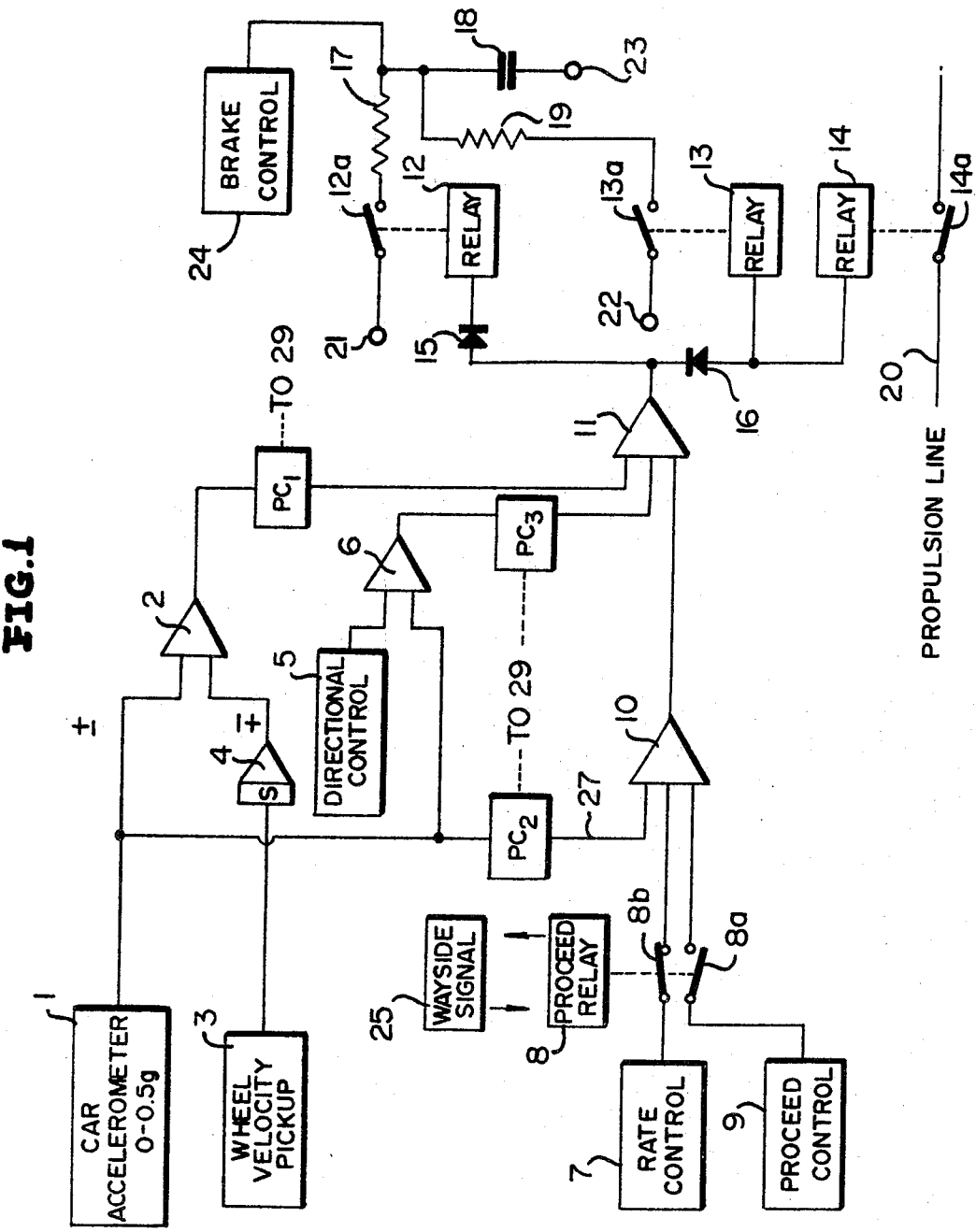
FIGURE 1 is a circuit diagram, partly schematic and partly in block, of a preferred embodiment of the system of the invention.

The respective signal voltages of accelerometer 1 and of a direction control 5 are applied to a summing amplifier 6, FIGURE 1, which together with amplifier 2 supplies its output to a summing amplifier 11. In FIG. 1, the representation of amplifier 6 and direction control 5 are incomplete as to details. Therefore, reference is made to FIGURE 2 of the drawings, wherein is illustrated a complete system for controlling brakes so as to set limits to acceleration or deceleration of a vehicle in either direction of travel.

Figure 2:
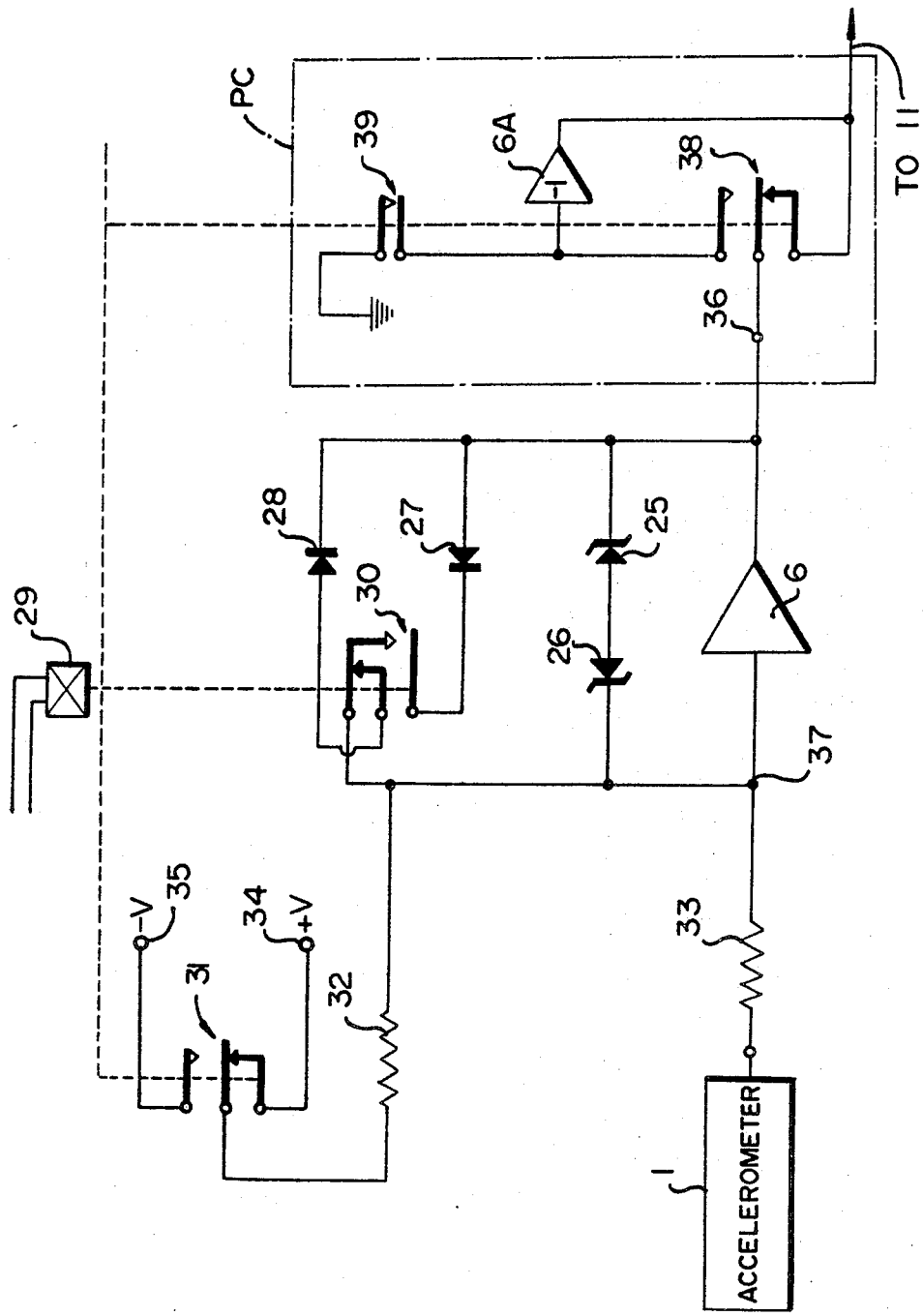
FIGURE 2 is an expanded circuit diagram of a portion of the system of FIGURE 1.

Referring to FIGURE 2 of the drawings, 29 is a vehicle direction relay, whose contacts assume the conditions illustrated, and which is de-energized, for forward direction of vehicle travel. The output of accelerometer 1 proceeds to the input of amplifier 6. Connected across amplifier 6 are two back-to-back Zener diodes, 25, 26, which set limits to the voltage excursions of the amplifier 6 at +15 v. and −15 v., for the protection of the amplifier 6. A voltage +V at terminal 34 is established at such a level that when the output of accelerometer 1, which is proportional to the acceleration of the vehicle, exceeds a preset deceleration rate, the brakes will be released.

Voltage at terminal 34 is summed with the output of accelerometer 1. Amplifier 6 is a high gain amplifier, and provides an output only in response to the voltage of greater magnitude applied thereto, when two voltages of opposite sign are applied. If the output of accelerometer 1 is less than +V, the amplifier 6, at its output terminal 36, will attempt to provide −15 v., since amplifier 6 introduces a polarity reversal. As point 36 attempts to go negative, diode 28 will feed back this voltage via closed contact 30, to the input terminal 37 of amplifier 6, clamping the output of the amplifier 6 to zero. When the output of accelerometer 1 exceeds +V in absolute magnitude, but is negative, as during deceleration while the vehicle is proceeding forwardly, terminal 36 will tend to go positive to +15 v. The now closed lower contacts 38 will convey this voltage to a brake control system, described hereinafter, to cause brake release, and this brake release will be sustained until the output of the accelerometer is overbalanced by +V. The vehicle is thus unable to brake at a higher rate than that corresponding to +V, and by presetting +V maximum braking rate can be preset.

If the vehicle is proceeding rearwardly, relay 29 is energized, opening the closed contacts 31, 30, 38, 39, and closing those which are open, as illustrated in the drawings. Thereby a reference voltage of −V is established, provided at terminal 35, which presets maximum deceleration rate rearwardly. Accelerometer 1 now provides a positive voltage on deceleration, instead of a negative voltage.

If now the positive output of accelerometer 1 exceeds −V, a negative voltage appears at terminal 36, which is blocked by diode 27 but finds no circuit through diode 28, because it finds open contacts at switch 30. Therefore, a voltage tending toward −15 v. will appear at terminal 36. If the output of accelerometer 1 is less than the voltage at terminal 35, on an absolute basis, a positive voltage will tend to appear at terminal 36, but will feed back to terminal 37 via diode 27 and the now closed contacts of switch 30 and clamp the voltage of terminal 36 at zero. Amplifier 6A now receives the negative voltage at terminal 36, and reverses polarity, providing a positive voltage to the brake control system, hereinafter described, to effect brake release until the accelerometer output becomes smaller in absolute sense than the voltage applied to terminal 35, i.e., −V. Resistors 32 and 33 provide current limiting.

While the vehicle is accelerating accelerometer 1 provides a signal of the same algebraic sign as its control, +V or −V, and hence cannot override the latter, and hence is totally ineffective.

To recapitulate the operation of the circuitry of FIGURE 2, briefly and in broad stroke:

The output of accelerometer 1 is applied to amplifier 6, to which is also applied a directional maximum deceleration control signal from direction control 5. These components of the system limit deceleration of the car, in either forward or reverse direction of travel. The output of accelerometer 1 has an algebraic sign which depends on (1) whether the car is accelerating or decelerating, and (2) the direction of the car, i.e., forward or reverse. The output of the accelerometer 1, if negative in response to deceleration while the car is proceeding in a forward direction, will be positive while the car is decelerating, but proceeding in a rearward direction. Direction control inserts a signal of proper polarity, according to direction of travel, and of preset amplitude, to provide an output only when the decelerating output of accelerometer 1 exceeds a pre-established limit.

Referring now again to FIGURE 1, rate control 7 provides a signal representing a braking rate. With proceed relay 8 in the condition illustrated, the output of rate control 7 is led to summing amplifier 10. Rate control 7 may be controlled to insert a desired rate, from a locomotive, or by wayside communication, or in any other convenient method, as by program. The desired rate signal is passed through summing amplifier 11, which provides a positive output signal. The latter passes through diodes 15 to energize relay 12. The latter closes contacts 12a, closing a circuit from positive voltage terminal 21 to the RC timing circuit composed of series resistance 17 and shunt capacitor 18. The voltage level is applied to brake control 24, to apply the brakes to a degree proportional to the voltage level. Brake control 24 may be any suitable voltage-to-air pressure transducer for supplying air pressure to a brake cylinder proportional to the level of signal voltage supplied thereto, as determined by the degree of charge on capacitor 18. The rate at which the brakes are applied is determined by the ability of the resistor 17 to charge the capacitor and to supply the brake control 24, so that for full brake control current, capacitor 18 is fully charged.

As the brakes are applied accelerometer 1 senses deceleration forwardly, and produces a positive output signal, which tends to cancel the negative signal deriving from rate control 7. When the actual acceleration, as measured by accelerometer 1 substantially equals the desired acceleration as set by rate control 7, no signal is available to maintain relay 12 energized. On de-energization of relay 12, contacts 12a open, disconnecting terminal 21 from brake control 24. The charge on capacitor 18 now establishes the desired voltage level for brake control 24, lapping off the brakes, that is, holding them applied at the attained degree. There thus exists a control of deceleration in accordance with the programme established by rate control 7. Any tendency to decelerate faster than the programme calls for is counterbalanced by control signal from accelerometer 1. A desired deceleration profile can thus be adhered to.

A car normally has a dynamic brake and a friction brake, brake control 24 controlling only the latter. Were the dynamic brake to provide excess braking effort, the system would automatically release the brake control 24 sufficiently to establish the correct rate called for by rate control 7. On the other hand, if the weight of the car is excessive, requiring greater braking effort, brake control 24 would add braking effort. The system thus maintains the desired braking profile for all car weights and for all dynamic braking efforts, regardless of the combination of magnitudes of the latter two effects.

To indicate one desired mode of operation, assume a desired braking profile is inserted in rate control 7. The train proceeds until it passes a wayside signal station 25, which transfers a signal to proceed relay 8. The latter is energized and the braking operation proceeds, on a program which is to bring the train to a stop at a desired location, i.e., a station stop. The system, in so proceeding, automatically takes account of train weight and operation of dynamic brakes, throughout the program.

When the train is brought to a complete stop the deceleration signal provided by accelerometer 1 fades to zero, leaving rate control 7 calling for full brake. Thus an automatic full service brake occurs at the end of the stop.

When a proceed signal is received, proceed relay 8 pulls up, closing contacts 8a and opening contacts 8b, thereby removing the positive output from amplifier 11 and causing relay 12 to be de-energized. Proceed control 9 supplies a negative signal, via closed contacts 8a, and after proceeding through amplifiers 10 and 11, the negative signal proceeds via diode 16 to relay 13, diode 15 now blocking. Negative signal passed by diode 16 operates relays 13 and 14.

Relay 13, when energized, closes contacts 13a. Relay 14, when energized, closes contacts 14a, completing the circuit of a line 20, which calls for power. Closure of contacts 13a supplies a ground to which capacitor 18 may discharge rapidly through timing resistance 19, thus effecting a fast release of the brakes.

The primary control of the present system derives from rate control 7 and signal applied directly from accelerometer 1 via lead 27. Rate control 7, on a command signalled by relay 8, in closing contacts 8b, provides operating signal to brake control 24. The train commences to decelerate. If deceleration is excessive, signal from accelerometer 1, applied via lead 27 overbalances the rate control signal. The rate control 7 is assumed to provide negative signal, and the accelerometer positive signal, on deceleration during forward motion of the train. In such case relay 12 will remain energized so long as actual deceleration does not exceed programmed deceleration. If actual deceleration is the greater, the programmed rate control will be pre-empted, i.e., the net signal out of amplifier 11 will be negative, and the negative signal will proceed via diode 16 to energize relay 13 and release the brakes, reducing deceleration until the rate established by the rate control is again attained, when positive signal will be applied from amplifier 11 via diode 15 to relay 12, and the brakes will be reapplied.

The braking system is of the proportional type, and when applied tends to establish the correct rate via the control system, the accelerometer 1 modulates braking, by partially reducing the braking effort during an over-deceleration, and thus maintains the correct rate of deceleration.

During the time that rate control and accelerometer 1 are effecting a controlled deceleration it can be assumed that no output is supplied from amplifiers 2 and 6. Amplifier 2 provides output signal only under wheel slippage or spinning conditions. If the wheels slip or spin, this fact is sensed in terms of a divergence between the output of accelerometer 1 and of the time differential of the output of velocity pickup 3. So long as there is no slippage or spinning of the wheels the two quantities are equal, and arranged to provide signals of opposing polarity. The output of amplifier 2 is then zero. If there is spinning this is due to wheel acceleration being greater than car acceleration. Vice versa, if there is slippage, this is due to wheel deceleration being greater than car deceleration. Output then occurs from amplifier 2, but this output has a polarity depending on which of the two alternate events occurs. If the wheels are decelerating faster than the car a negative signal is applied to amplifier 11, reducing total braking until slippage is overcome. If the wheels are accelerating faster than the car, that is spinning as during propulsion this is not a braking problem, but in such case a net positive signal is provided by amplifier 11 to induce braking. Normally, correction of slippage or spinning is a momentary operation, although correction will continue as long as error is present.

The inclusion or exclusion of slipping or spinning correction circuitry in or from the present system represents a matter of choice, but its presence provides a mechanism for correction spin during acceleration of a train, as well as for correcting slippage during braking, utilizing the structure following amplifier 11, in any event present, for this purpose.

The signal provided by directional control 5, in conjunction with the signal provided by the accelerometer 1 provides an optionally included acceleration limit system, which comes into play by cancelling enough brake signal into amplifier 11 to maintain the controlled train within deceleration limits. This is particularly useful where rate control signal is not being supplied by rate control 7.

The circuitry comprised of switches 38, 39 and of polarity reversing amplifier 6A, operated by relay 29, constitute a polarity corrector PC. Polarity correctors PC1 and PC2 are provided at the output of amplifier 2 and at the input of amplifier 10, via lead 27, for the signal provided by accelerometer 1, in order to provide correct polarities of control voltage during reverse motion of the vehicle, to take account of the fact that the accelerometer generates the same voltage on deceleration while proceeding forwardly as it does on acceleration while proceeding rearwardly.

In summary, the present system requires a positive voltage, applied via diode 15, to apply brakes and a negative voltage applied via diode 16 to release brakes and apply propulsion.

The amplifier 11 provides a reversal of polarity, as do also amplifiers 2, 6 and 10. Therefore, accelerometer 1 must apply a negative signal which is not counterbalanced, to normalize brake control 24 when the vehicle being controlled is proceeding forwardly, to release the brakes.

Accelerometer 1, wheel velocity pickup 3, differentiator 4, and summing amplifier 2 may be denoted an acceleration error system. A velocity input from a wheel of the vehicle may be derived from a wheel mounted generator or tachometer. This output is differentiated by differentiator 4 to provide an angular acceleration voltage output. This voltage output is compared with the voltage output of accelerometer 1, the outputs being equal and opposite when the wheels are not spinning or slipping.

During a normal sequence of operation of the present system, assuming either forward or reverse drive, and either acceleration or deceleration, if the vehicle is proceeding forwardly and deceleration is called for by rate control 7, a positive signal is applied via diode 15 to relay 12. Brakes are thus applied. As the brakes are applied, accelerometer 1 senses a change of velocity, producing a negative output signal. As deceleration increases, the negative signal increases toward a value equal to the positive signal, until ultimately the two signals are equal, thus nullifying each other and resulting in zero output being applied to relay 12, and switch 12a opens. Due to PC2, polarities remain correct for deceleration in either direction of travel, i.e., accelerometer output is reversed for reverse travel of the vehicle, but PC2 corrects for the reversal. This part of the system supplies means of dynamically weighing the vehicle, or compensating for its weight, and also of so controlling brake control 24 as to produce a resultant braking effect reflected by the accelerometer to accord to that of the rate control 7.

When deceleration has decreased sufficiently, following brake release, the control signal goes back to positive and the brake is reapplied. Thus an error signal is generated which tends to maintain actual deceleration at the desired value.

When the car comes to a stop, accelerometer output is zero, and the brake is thus fully on and propulsion power fully off.

A proceed signal obtained by closing contacts 8a, and being negative, energizes relay 14 and thereby the propulsion line 20. At the same time contacts 8b have opened, releasing the brakes.

When the vehicle is accelerating forwardly, the output of accelerometer 1 becomes positive. That output therefore, becomes a source of comparison voltage with respect to the proceed signal, which is negative. If actual forward acceleration exceeds that called for, a net positive signal is applied to diodes 15, 16, propulsion is terminated and brakes applied, and the over-acceleration reduced to that called for. When the accelerometer reverses signal while traveling rearwardly, accelerometer signal is reversed by PC2, and operation proceeds as described.

Accelerometer 1 provides a negative signal when the vehicle is decelerating and proceeding forwardly. If now the wheels slip, the positive output of differentiator 4 decreases and a net negative signal is applied to relays 13 to cause brake release, thus decreasing wheel deceleration until wheel slippage terminates. On acceleration of the wheel back toward a speed corresponding to car speed, the output of differentiator 4 reverses polarity to cause a net positive signal to be applied to relay 12, resulting in reapplication of the brakes. Were the vehicle decelerating while moving rearwardly, accelerometer and differentiator outputs would reverse sign, but PC–1 would effect a sign reversal, so that again brake release and reapplication would occur.

Were the vehicle wheels to spin during acceleration this would indicate that they had high acceleration. On forward movement of the vehicle, the differentiator 4 could provide a high positive signal while accelerometer 1 would provide a lower negative signal, resulting in energization of relay 12 and consequent energization of brake control 24, and interruption of propulsion power until wheel spin terminates. Upon deceleration of the wheel incident to return to non-spin condition, the polarity of the signal from the differentiator is reversed, resulting in deenergization of relay 12 and energization of relays 13 and 14, and consequently release of the brakes and restoration of propulsion power.

The operation of the acceleration limit system involving amplifier 6 provides that if the accelerometer output exceeds a preset limit, the error signal of amplifier 6 will control brake or propulsion until that error signal is reduced to zero. The operation of the circuitry of FIGURE 2 may be arranged to provide an overriding control, i.e., the output of amplifier 6, if such occurs at all, at a preset limit, specifically ±V, which overrides any other input which can occur at amplifier 11. However, it is within the philosophy of the present system to apply more limited control from amplifier 6, which does not under all conditions of operation override other control signals.

Amplifier 11 sums the total input from all control amplifiers, i.e., 2, 6, 10, and thus provides a net control output.

The question then arises: Which control amplifier will override the others? Normally, amplifier 2 will be arranged to override signal deriving from amplifier 10, if and when wheel slip or spin occurs, by releasing or applying just enough brake to terminate slip or spin, and will provide normal signal when this abnormal condition is terminated.

Amplifier 6 will override, to keep retardation rate or acceleration rate within tolerable limits. Once this has occurred only amplifier 10 will control. Control by amplifiers 2 and 6 may be looked on as abnormal and involving infrequent occurrence.

While I have described an illustrated one specific embodiment of my invention, it will be clear that variations of the details of construction which are specifically illustrated and described may be resorted to without departing from the true spirit and scope of the invention as defined in the appended claims.

What is claimed is:

1. In a brake control system for a car,
   a brake control for said car,
   an accelerometer secured to said car and providing a first signal representing the acceleration of said car,
   a rate control for providing a second signal indicative of a desired braking contour for said car,
   means for comparing said first and second signals to derive an error signal,
   means responsive to said error signal for controlling braking of said car so as to tend to maintain said braking control by controlling said brake control,
   wherein said error signal has alternative characters,
   a propulsion control,
   means responsive to said error signal when of one of said alternative characters for actuating said propulsion control, and
   means responsive to said error signal when of the other of said alternative characters for actuating said brake control.

2. In a brake control system for a car,
   a brake control for said car,
   a linear accelerometer secured to said car and providing a first signal representing linear acceleration of said car,
   means for providing a second signal representative of angular acceleration of at least one wheel of said car,
   means for comparing said first and second signals to derive an error signal,
   means responsive to said error signal to control said brake control control in such sense as to tend to minimize divergence of said linear and angular accelerations,
   wherein said error signal has alternative characters,
   a propulsion control for said car,
   means responsive to said error signal when of one of said alternative characters for actuating said propulsion control, and
   means responsive to said error signal when of the other of said alternative characters for actuating said brake control.

3. An acceleration limit system for vehicles comprising
   an accelerometer secured to said vehicle providing an acceleration representing voltage of magnitude and algebraic sign representative of magnitude and algebraic sign of aceleration of said vehicle,
   sign of acceleration of said vehicle,
   a source of first reference voltage of one algebraic sign,
   a source of second reference voltage of sign opposite to said one algebraic sign,
   means for effecting a comparison magnitude of said acceleration voltage with one of said first and second reference voltages, including means for selecting one of said first and second reference voltages for comparison according to direction of travel of said vehicle, and means for reducing said acceleration of said vehicle only when said acceleration representing voltage exceeds the selected reference voltage.

4. The combination according to claim 3, wherein is provided
   a braking system for said vehicle, and
   means including said braking system for reducing said acceleration.

5. An acceleration and deceleration limiting system for a vehicle, operative during either direction of travel of said vehicle, comprising
   means for sensing an algebraic value of acceleration of said vehicle to provide an acceleration signal,
   means for sensing direction of travel of said vehicle to provide a direction signal,
   means providing acceleration limit signals for either direction of travel, and
   comparison means responsive to said acceleration signal, said direction signal and said acceleration limit signals for limiting the acceleration and deceleration of said vehicle to predetermined values during either direction of travel of said vehicle.

6. A vehicle control system, comprising
   a linear accelerometer secured to said vehicle,
   an angular accelerometer secured to a wheel of said vehicle,
   said accelerometers providing signals of equal and opposite polarities while said wheel is neither spinning nor slipping,
   a comparator for comparing said signals, said comparator being arranged to provide zero output while said wheel is neither spinning nor slipping, and
   means responsive to the output of said comparator for providing diverse signals representative of slip and spin of said wheel, respectively, during such slip and spin.

7. The combination according to claim 6 wherein is provided
   a brake and propulsion system for said vehicle, and
   means responsive to said diverse signals for ameliorating said slip or spin of said wheel by controlling said brake and propulsion system.

8. The combination according to claim 7 wherein is further provided means for limiting acceleration of said vehicle to below a pre-established value, said last means being responsive to said linear accelerometer.

9. The combination according to claim 7, wherein is further provided
   means for maintaining deceleration of said vehicle in accordance with a predetermined profile,
   said last means including means for providing profile signal representing said profile,
   means comparing said profile signal with signal provided by said accelerometer to derive an error signal,
   a braking system for said vehicle,
   a propulsion system for said vehicle, and
   means responsive to said error signal for controlling said braking system and said propulsion system so that said error signal is reduced.

10. The combination according to claim 9 wherein is further provided means including said braking system and said propulsion system for limiting accelerations of said vehicle to predetermined values, said last means being responsive to said linear accelerometer.

11. A brake control system, including
   normally open brake control contacts,
   normally open propulsion control contacts,
   a first diode poled to pass signal of one polarity,
   a second diode poled to pass signal of opposite polarity to said one polarity,
   a control terminal providing control signal of either polarity at random,
   a brake control,
   a first relay coil operative when energized to close said brake control contacts,
   means connecting said first diode between said first relay coil and said control terminal,
   a second relay coil operative when energized to close said propulsion control contacts,
   means connecting said second diode between said control terminal and said second relay coil,
   a level indicating capacitor connected in shunt to said brake control,
   a timing resistance connected in series with said brake control and said capacitor via said brake control contacts, and
   means including a second timing resistance responsive to energization of said second relay coil for rapidly discharging said capacitor.

12. In a vehicle control system,
   means including a single accelerometer for providing a sensed signal of one polarity in response to deceleration of said vehicle while said vehicle is proceeding forwardly, and of opposite polarity in response to acceleration of said vehicle while said vehicle is proceeding forwardly,
   means for establishing control signal of opposite polarities representative of desired deceleration and acceleration of said vehicle, respectively,
   means responsive to said sensed signal and said control signal for deriving an error signal representative of excess of acceleration or deceleration of said vehicle,
   a braking system for said vehicle,
   a propulsion system for said vehicle, and
   means responsive to said error signal for reducing said error signal toward zero by control of said braking and propulsion systems.

13. In a vehicle control system,
   means including a single accelerometer for providing a sensed signal of one polarity in response to forward deceleration and rearward acceleration, and of opposite polarity in response to rearward deceleration and forward acceleration of a vehicle,
   means for establishing control signal of opposite polarities representative of desired deceleration and acceleration of said vehicle either forwardly or rearwardly,
   means responsive to said sensed signal and said control signal for deriving a single error signal of selectively opposite polarities and representative of excess of acceleration or deceleration either forwardly or rearwardly,
   a braking system for said vehicle,
   a propulsion system for said vehicle, and
   means responsive to said error signal for reducing said error signal toward zero by control of said braking system and of said propulsion system.

References Cited
UNITED STATES PATENTS

| | | |
|---|---|---|
| 2,892,660 | 6/1959 | Reswick et al. |
| 2,994,564 | 8/1961 | Ferguson. |
| 3,022,114 | 2/1962 | Sampietro. |
| 3,026,148 | 3/1962 | Ruof. |

DUANE A. REGER, *Primary Examiner.*